A. B. FOANS.
WAGON ROCKER.
APPLICATION FILED MAR. 26, 1919.
1,345,322. Patented June 29, 1920.
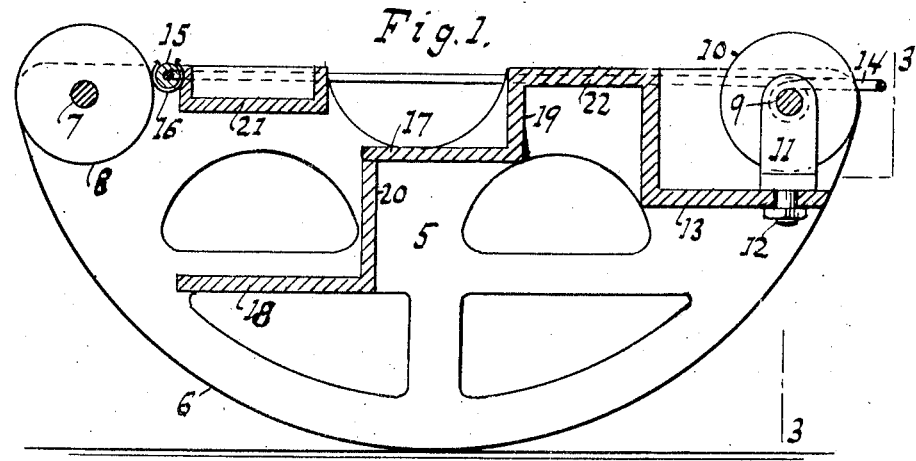
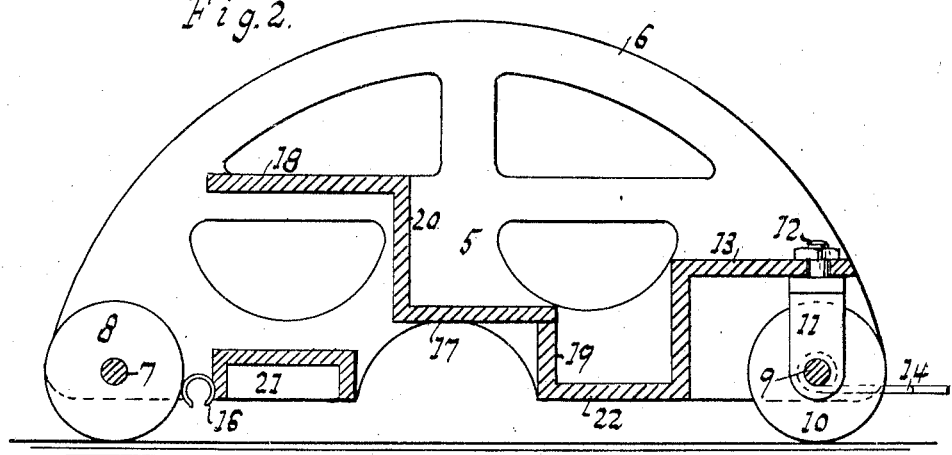
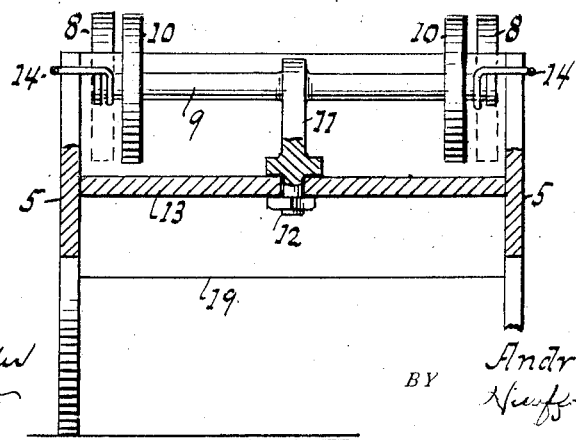
WITNESSES:
William Miller
Katharine S. Keane
INVENTOR
Andrew B. Foans
BY
ATTORNEYS

UNITED STATES PATENT OFFICE.

ANDREW B. FOANS, OF NEW YORK, N. Y.

WAGON-ROCKER.

1,345,322.  Specification of Letters Patent.  Patented June 29, 1920.

Application filed March 26, 1919. Serial No. 285,281.

*To all whom it may concern:*

Be it known that I, ANDREW B. FOANS, a citizen of the United States, residing at New York, in the county of New York and State of New York, have invented new and useful Improvements in Wagon-Rockers, of which the following is a specification.

This invention relates to a combination rocking-chair and wagon which is essentially suitable for the amusement of a child, and the fundamental object of the invention is to provide the device with permanently fixed rockers and wheels so that the device can be quickly manipulated by any inexperienced person or child.

The invention is designed to include a frame having a plurality of wheels mounted thereon for operating the device as a wagon and rockers carried by the frame for converting the wagon, merely by inverting the frame, into a rocking chair.

Another object of the invention is, to provide the frame with a swiveling axle and a tongue or bail swingingly connected to the axle for drawing the vehicle.

Another object of the invention is to provide a transverse support secured between the frames and made to serve as a seat whenever the rocker or wagon is in action.

The novel combination of parts are more fully described in the following specification and claims, reference being made to the accompanying drawing in which:

Figure 1 represents a vertical longitudinal section showing the rocker in action.

Fig. 2 is a similar section showing the wagon in action.

Fig. 3 is a transverse section taken along the line 3—3 of Fig. 1.

In the drawing the numeral 5 designates a pair of side frames preferably made of wood and each having a rocker 6 extending to the top of the frame. Between the frames is rotatively journaled a shaft or axle 7 and on the axle are mounted a pair of wheels 8. At the opposite portion of the frame is swiveled a steering device consisting of a shaft 9 having thereon a pair of wheels 10 and fixed to the shaft is a carriage 11. The carriage is bolted at 12 to a transverse frame 13 which is secured to the side frames.

A tongue or bail 14 having a handle 15 is made to draw the wagon. When the rocker is in use the bail is swung over the sides of the frame and is held by having the handle engage a spring clasp 16 secured in a notch in the side frame as indicated in Fig. 1. When the bail is in use as shown in Fig. 2 it can be swung outwardly by turning it about the shaft 9 and the wagon can be steered by oscillating the carriage with the frame 13 as the fulcrum.

When the device is utilized as a rocking-chair the child sits on a seat 17 with its feet on a baseboard 18 fastened to the frames. In this position the riser 19 serves as a back rest for the child and a riser 20 as a support for the seat. A tray 21 fixed between the frames is adapted to hold marbles or other articles for the child to play with. It will be seen that when the rocker is inverted as indicated in Fig. 2, the frames will be supported on the wheels and by hauling on the bail the wagon is wheeled along the ground. The parts such as the wheels and seats being permanently fixed require no positioning for converting the rocker into a wagon. In both positions the transverse board 17 serves as a seat but the riser 20 performs the function of a support for the seat as noted above and also as a rest for the back of the child when used as a wagon, while a board 22 is arranged for resting the feet.

I claim:—

1. A wagon rocker comprising a frame having a rocker, wheels carried by the frame for converting the rocker into a wagon by inverting the frame, a seat secured to the frame, and means including a pair of risers connected to the seat immovable relative to the frame for supporting the back and feet of the operator.

2. A wagon rocker comprising a pair of side frames each having a rocker, wheels carried by the frames for converting the rocker into a wagon by inverting the frames, a seat immovably secured between the frames, a foot rest fixed to the frames, and a pair of risers connected to the seat for supporting the back of the operator.

3. A wagon rocker comprising a pair of side frames each having a rocker, wheels carried by the frames for converting the rocker into a wagon by inverting the frames, a seat immovably secured between the frames, a pair of transverse foot rests fixed to the frames, and a pair of risers connecting the foot rests with the seat for supporting the back of the operator.

In testimony whereof I have hereunto set my hand in the presence of two subscribing witnesses.

ANDREW B. FOANS.

Witnesses:
 KATHARINE S. KEANE,
 WILLIAM MILLER.